(12) United States Patent
Duke

(10) Patent No.: US 9,836,588 B2
(45) Date of Patent: Dec. 5, 2017

(54) PASSWORD FRAUD PROTECTION APPARATUS

(71) Applicant: Access Defender Limited, Herefordshire (GB)

(72) Inventor: David J. Duke, Corby (GB)

(73) Assignee: ACCESS DEFENDER LIMITED, Herefordshire (GB)

( * ) Notice: Subject to any disclaimer, the term of this patent is extended or adjusted under 35 U.S.C. 154(b) by 425 days.

(21) Appl. No.: 14/469,726

(22) Filed: Aug. 27, 2014

(65) Prior Publication Data

US 2015/0067607 A1 Mar. 5, 2015

(30) Foreign Application Priority Data

Aug. 27, 2013 (GB) .................................. 1315235.0

(51) Int. Cl.
| G06F 3/0484 | (2013.01) |
| G06F 21/31 | (2013.01) |
| G06F 21/83 | (2013.01) |
| G06F 3/023 | (2006.01) |

(52) U.S. Cl.
CPC ............ G06F 21/31 (2013.01); G06F 3/0236 (2013.01); G06F 21/83 (2013.01)

(58) Field of Classification Search
CPC ...... G06F 3/048–3/04897; G06F 21/31; G06F 21/83
See application file for complete search history.

(56) References Cited

U.S. PATENT DOCUMENTS

| 5,428,349 | A  | * | 6/1995 | Baker ................. | G06Q 20/382 |
| | | | | | 235/382.5 |
| 5,608,387 | A  | * | 3/1997 | Davies .................... | G06F 21/36 |
| | | | | | 340/5.27 |
| 6,246,769 | B1 | * | 6/2001 | Kohut ................. | G06Q 20/341 |
| | | | | | 380/45 |
| 6,434,702 | B1 | * | 8/2002 | Maddalozzo, Jr. ... | G06F 3/0238 |
| | | | | | 382/115 |
| 6,580,815 | B1 | * | 6/2003 | Grajewski ............... | G06F 21/32 |
| | | | | | 340/5.53 |
| 7,127,088 | B1 | * | 10/2006 | Grajewski ............... | G06F 21/32 |
| | | | | | 382/124 |
| 9,030,293 | B1 | * | 5/2015 | Tabak ..................... | G06F 21/30 |
| | | | | | 340/5.54 |

(Continued)

Primary Examiner — Kieu Vu
Assistant Examiner — Alvaro R Calderon, IV
(74) Attorney, Agent, or Firm — Renner Otto Boisselle & Sklar, LLP

(57) ABSTRACT

A locking apparatus is provided which includes a display including a plurality of characters comprising the predetermined characters of the personal identification code, a pointer for moving along the plurality of characters on the display means and a controller for selecting the predetermined characters of the personal identification code when the pointing means moves along the plurality of characters on the display means. The controller is configured to select a first predetermined character of the personal identification code when the pointing means is configured to move in a first direction on the display means and to pass the first predetermined character and then to stop randomly between the first predetermined character and a first predetermined marker character on the display means. The apparatus provides password fraud protection.

17 Claims, 3 Drawing Sheets

(56) References Cited

U.S. PATENT DOCUMENTS

| | | | | |
|---|---|---|---|---|
| 2002/0122031 A1* | 9/2002 | Maglio | ................ | G06F 3/0233 |
| | | | | 345/184 |
| 2003/0024977 A1* | 2/2003 | Plummer | ................ | B60R 25/00 |
| | | | | 235/375 |
| 2005/0060554 A1* | 3/2005 | O'Donoghue | .......... | G06F 21/36 |
| | | | | 713/183 |
| 2006/0020815 A1* | 1/2006 | Varghese | ................ | G06F 21/36 |
| | | | | 713/182 |
| 2006/0288226 A1* | 12/2006 | Kowal | .................... | G06F 21/36 |
| | | | | 713/182 |
| 2007/0011738 A1* | 1/2007 | Doss | ........................ | G06F 21/36 |
| | | | | 726/18 |
| 2010/0325046 A1* | 12/2010 | Milne | ................ | G06Q 20/1085 |
| | | | | 705/44 |
| 2011/0004928 A1* | 1/2011 | Won | ........................ | G06F 21/36 |
| | | | | 726/7 |
| 2012/0011370 A1* | 1/2012 | Duke | ...................... | G06F 21/36 |
| | | | | 713/183 |
| 2013/0318597 A1* | 11/2013 | Parsons | .................. | G06F 21/36 |
| | | | | 726/19 |
| 2014/0283009 A1* | 9/2014 | Hsueh | .................. | G06F 3/0488 |
| | | | | 726/18 |
| 2015/0046993 A1* | 2/2015 | Arceo | ................ | H04L 63/0838 |
| | | | | 726/7 |
| 2015/0312242 A1* | 10/2015 | Ogawa | .................... | G06F 21/34 |
| | | | | 726/6 |

\* cited by examiner

PASSWORD FRAUD PROTECTION APPARATUS

CROSS-REFERENCE TO RELATED APPLICATION

The present application claims priority under 35 USC §119 to Great Britain Patent Application No. 1315235.0, filed Aug. 27, 2013, the entire disclosure of which is incorporated herein by reference.

FIELD OF THE INVENTION

This invention relates to an apparatus for selecting predetermined characters of a personal identification code or a password.

BACKGROUND TO THE INVENTION

Obtaining authorised personal identification (PIN) codes or passwords are well known. Unauthorised persons can obtain a user's authentication code as it is being correctly entered into a combination lock or an existing internet-based system. The code can be obtained by several methods for example by looking over the shoulder of the user or spying remotely with the use of visual aids.

It is an object of the present invention to stop unauthorised people from obtaining someone's password.

STATEMENT OF INVENTION

According to one aspect of the present invention, there is provided an apparatus for selecting predetermined characters of a personal identification code. The apparatus comprises: display means comprising a plurality of characters comprising the predetermined characters of the personal identification code; pointing means for moving along the plurality of characters on the display means; control means for selecting the predetermined characters of the personal identification code when the pointing means moves along the plurality of characters on the display means; wherein the control means is configured to select a first predetermined character of the personal identification code when the pointing means is configured to move in a first direction on the display means and to pass the first predetermined character and then to stop randomly between the first predetermined character and a first predetermined marker character on the display means; and wherein the control means is configured to select a second predetermined character of the personal identification code when the pointing means is configured to move in a second direction and to pass the second predetermined character and then to stop randomly between the second predetermined character and a second predetermined marker character on the display means.

The present invention helps to ensure that a predetermined character of the password is selected when the pointer is positioned between the character and a marker character so that the position of the pointer does not indicate to the actual predetermined selected character. The selected character and the marker character has to be linked with each other that when the pointer is stopped anywhere between the marker character and the predetermined character, the predetermined character of the password is selected.

The first direction of the pointing means may be opposite the second direction of the pointing means. This helps to ensure that the complexity of the movement of the pointing device is increased and therefore it would be even difficult to steal the password.

The predetermined character of the personal identification code and the corresponding predetermined marker character may be spaced apart by at least one character in between which is not the predetermined character and the corresponding marker character. This helps to ensure that there is sufficient scope for the pointer to stop between the predetermined character and the marker character.

The control means is configured to control the pointing means such that the pointing means stops after the predetermined character and before the corresponding predetermined marker character. This ensures that the pointing device passes the predetermined character and then stops after that so that the pointer does not directly indicates the selected character.

The predetermined marker character and the predetermined character to be selected may both designate a same character. In such a case, the predetermined character is the first character recognised on the display means and the marker character is the second same character recognised on the display means when the pointer is moving towards a particular direction.

Alternatively the predetermined marker character may be a different character compared with the predetermined character of the personal identification code. In this case the marker character can be a known character and can be fixed for each predetermined character selection.

The control means may be configured to couple with a server or an electronic system. The server or the electronic system may be configured to store the predetermined characters of the personal identification code. The control means may be configured to match each selected predetermined character with the stored predetermined characters in the server.

The predetermined characters of the personal identification code may be a plurality of digits. The predetermined characters of the personal identification code may be a plurality of symbols. The predetermined characters of the personal identification code may be a plurality of pictures. The predetermined characters of the personal identification code may be a combination of plurality of digits, symbols and pictures. The plurality of characters on the display means may be a plurality of digits. The plurality of characters on the display means may be a plurality of symbols. The plurality of characters on the display means may be a plurality of pictures.

A computer system may comprise the apparatus described hereinbefore. A mechanical lock may comprise the apparatus described hereinbefore. A mobile device may comprise the apparatus described hereinbefore.

According to a further aspect of the present invention, there is provided a method for selecting predetermined characters of a personal identification code using an apparatus comprising: display means comprising a plurality of characters comprising the predetermined characters of the personal identification code; pointing means for moving along the plurality of characters on the display means; and control means for selecting the predetermined characters of the personal identification code when the pointing means moves along the plurality of characters on the display means; the method comprising: moving the pointing means in a first direction on the display means; passing a first predetermined character on the display means; stopping the pointing means randomly between the first predetermined character and a first predetermined marker character on the display means; selecting the first predetermined character of the personal identification code by the control means on the basis of the position of the pointing means between the first predetermined character and the first predetermined marker character; moving the pointing means in a second direction on the display means; passing the second predetermined character on the display means; stopping the pointing means randomly between the second predetermined character and a second predetermined marker character on the display means; and selecting the second predetermined character of the personal identification code by the control means on the basis of the position of the pointing means between the second predetermined character and the second predetermined marker character. The first direction of the pointing means may be opposite the second direction of the pointing means.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1:
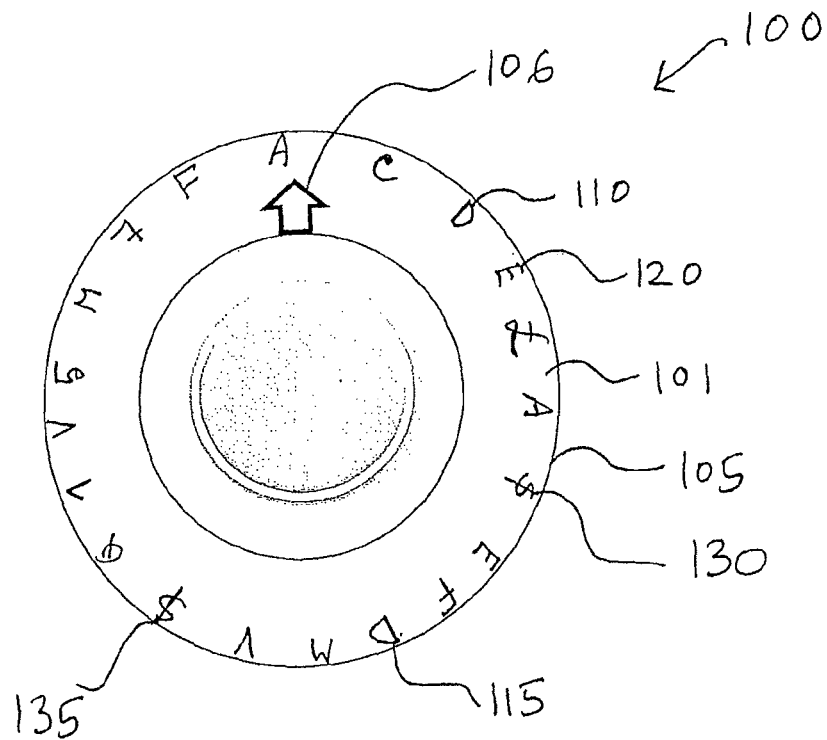
FIG. 1 shows a schematic illustration of a locking apparatus.

FIG. 1 shows a schematic illustration of a locking apparatus 100. The apparatus 100 includes a display surface 105. The perimeter of the display surface 105 includes a plurality of characters printed on it 105. The apparatus 100 further includes a pointing device or a pointer 106 which may be coupled with the display surface 105. In this embodiment, the pointer 106 is coupled to the central part of the circular display surface 105. The pointer 106 may be capable of rotating clockwise or anti-clockwise.

The apparatus 100 may also include a controller (not shown) which is configured to store a password or PIN of a user. When the user operates the pointer 106 along the display surface 105, the controller is configured to match each selected character with the stored password. When the controller finds an exact match (for example in a sequential order), it authorises the locking apparatus to open. In order to do so the controller may use a activation device known in the state of the art.

It will be appreciated that in this specification the term "character" is a generic term and includes numerical digits, alphabetical letters, symbols as well as pictures. However, the characters are still not limited to these only. They can be any other well know characters. Although in FIG. 1 the characters 101 are printed on the perimeter of the display surface 105, it will be appreciated that the characters 101 can be printed on the other parts of the display surface 105.

The following steps are now described with reference to the operation of locking apparatus 100.

S1: The controller is configured to store a password including characters "DE$"

S2: The user would like to select the character "D" by turning the pointer 106 on the display surface 105. In order to do this, the user turns the pointer 106, for example, in a clockwise direction, and looks for the character "D" 110 first time seen on the display surface 105 in the clockwise direction.

S3: The user then continues to turn the pointer 106 until it passes "D" 110 which is seen for the first time in the clockwise direction.

S4: The controller is already configured to store a marker character in relationship with the character "D" on the predetermined selected character. In this example the marker character is the same as the main character, i.e. the marker character is also a "D". In other words, the controller is already configured such that the marker character is designated as the second "D" 115 in the clockwise direction. The user then stops the pointer 106 randomly after the first "D" 110 and before the marker character (i.e. the second "D" 115 in the clockwise direction). As long as the pointer 106 stops between the predetermined character "D" 110 and the marker character (in this example, the second "D" 115), the predetermined character "D" 110 is selected.

S5: The user would then like to select the second predetermined character of the password. The second predetermined character is "E" which is stored in the controller.

S6: The user then turns the pointer 106 in an anti-clockwise direction and looks for the character "E" 120 first time seen in the anti-clockwise direction.

S7: The controller designates the second "E" 125 as the marker character seen on the display surface 105 in the anti-clockwise direction.

S8: The user then passes the pointer 106 the first "E" 120 and then stops the pointer 106 randomly after the first "E" 120 and before the second "E" 125 (the marker character).

S9: The controller then selects the predetermined character "E" and compares with the stored characters of the password.

S10: The user would then like to select the character "$", as this is the third character of the password "DE$". The user turns the pointer 106 in the clockwise direction (opposite the anti-clockwise direction) and looks for the character "$" 130 first time seen in the clockwise direction.

S11: The controller designates the second "$" 135 as the marker character in the clockwise direction. The user then turns the pointer 106 and passes the first "$" 130 and then stops randomly after the first "$" 130 and before the second "$" 135 (the marker character)

S12: Based on these actions, the controller then selects "$" as the third character and compares with the third character of the stored password. In this example, the controller finds the required match for the stored password and therefore the controller is configured to open the locking apparatus.

Although, in the embodiment of FIG. 1, the marker character is the same as the predetermined character to be selected, it will be appreciated that the invention is not limited to this feature. The marker character can be different from the predetermined character to be selected. For example, the marker character could be a known fixed character and the pointer has to be always stopped before the fixed marker character and after the predetermined character to be selected.

It will also be appreciated that the controller can be an electronic system in which the predetermined passwords are stored. The controller can also be a mechanical controller which is used as a standard component in a combination lock device.

Figure 2:
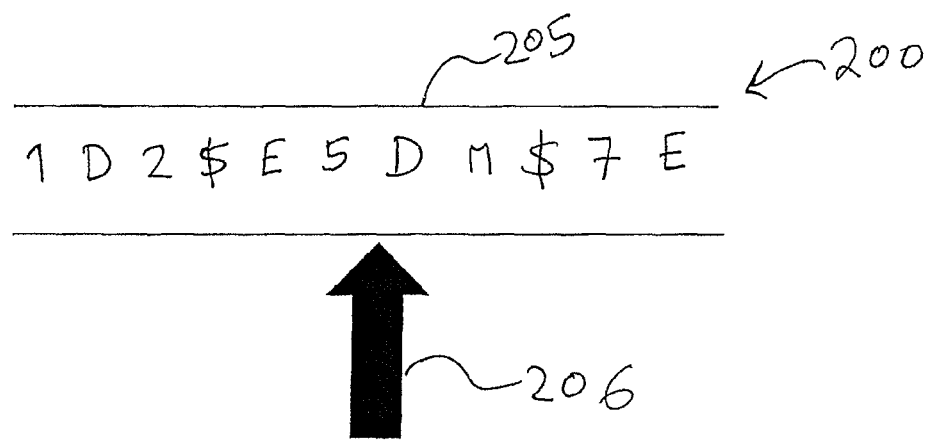
FIG. 2 shows a schematic illustration of an alternative locking apparatus.

FIG. 2 shows a schematic illustration of an alternative locking apparatus 200. The differences between the embodiments of FIGS. 1 and 2 are that the device of this embodiment does not have a circular display surface and the pointer is not at the centre of the circular display surface. Instead, the locking device of this embodiment includes a locking bar 206 and the characters are printed longitudinally on the locking bar 206. The apparatus 200 also includes a pointer 205 which is configured to slide along the longitudinal axis of the locking bar 206.

Apart from these structural differences from the embodiment of FIG. 1, the embodiment of FIG. 2 operates substantially the same way as FIG. 1. For example, there would be a predetermined character to be selected and a corresponding marker character. Each predetermined character of the password is selected when the pointer 206 is slid along the bar in a particular direction and passes the predetermined character and then stops after the predetermined character and before the marker character. The next predetermined character is selected when the pointer 206 is moved in the opposite direction and stopped after passing the next predetermined character and before the corresponding marker character.

Figure 3:
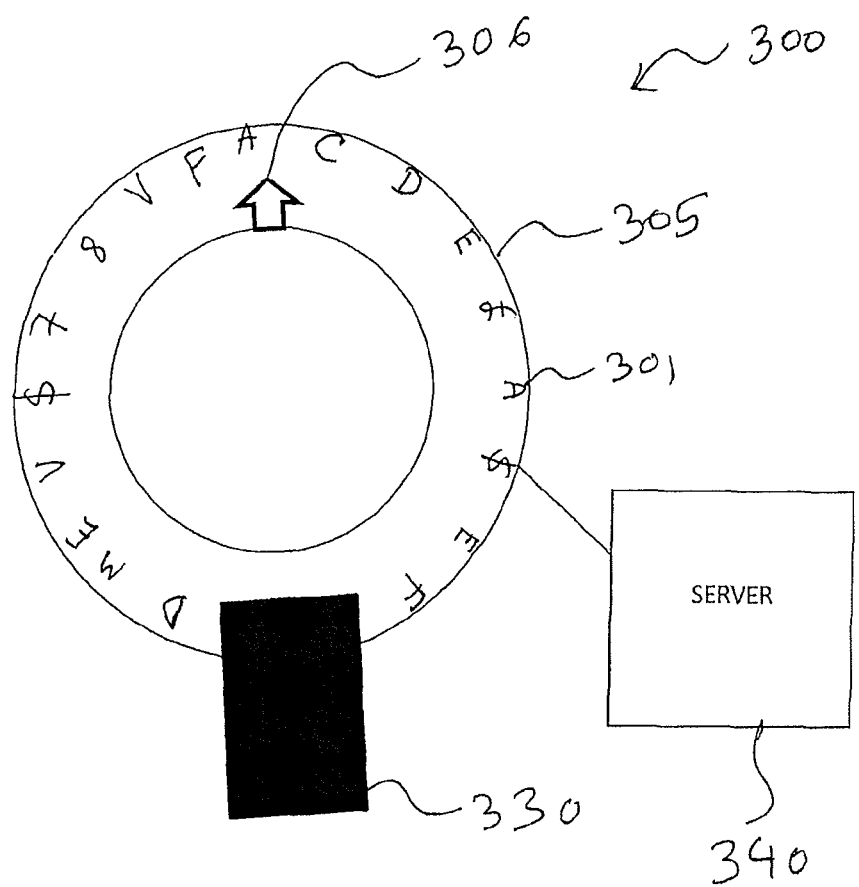
FIG. 3 shows a schematic illustration of an alternative apparatus.

FIG. 3 shows a schematic illustration of an alternative apparatus. The operation of the apparatus 300 is substantially the same as the apparatus 100 of FIG. 1. However, the differences are that the apparatus in this example is a computer or a mobile device. The apparatus 300 includes a display 305 in which various characters can be randomly generated. A pointer 306 is also provided. The computer or mobile device forming the apparatus 300 is programmed such that the pointer 306 can rotate according to a user's instructions. The characters 301 are randomly generated on the display 305. The apparatus 300 also includes a character generating bar 330 which is configured to generate new characters when the display 305 is rotated in each cycle.

The apparatus 300 is also configured to connect with a server 340 which stores all the passwords of the users. The selection of a predetermined character is substantially the same as the steps described in respect of FIG. 1.

Figure 4:
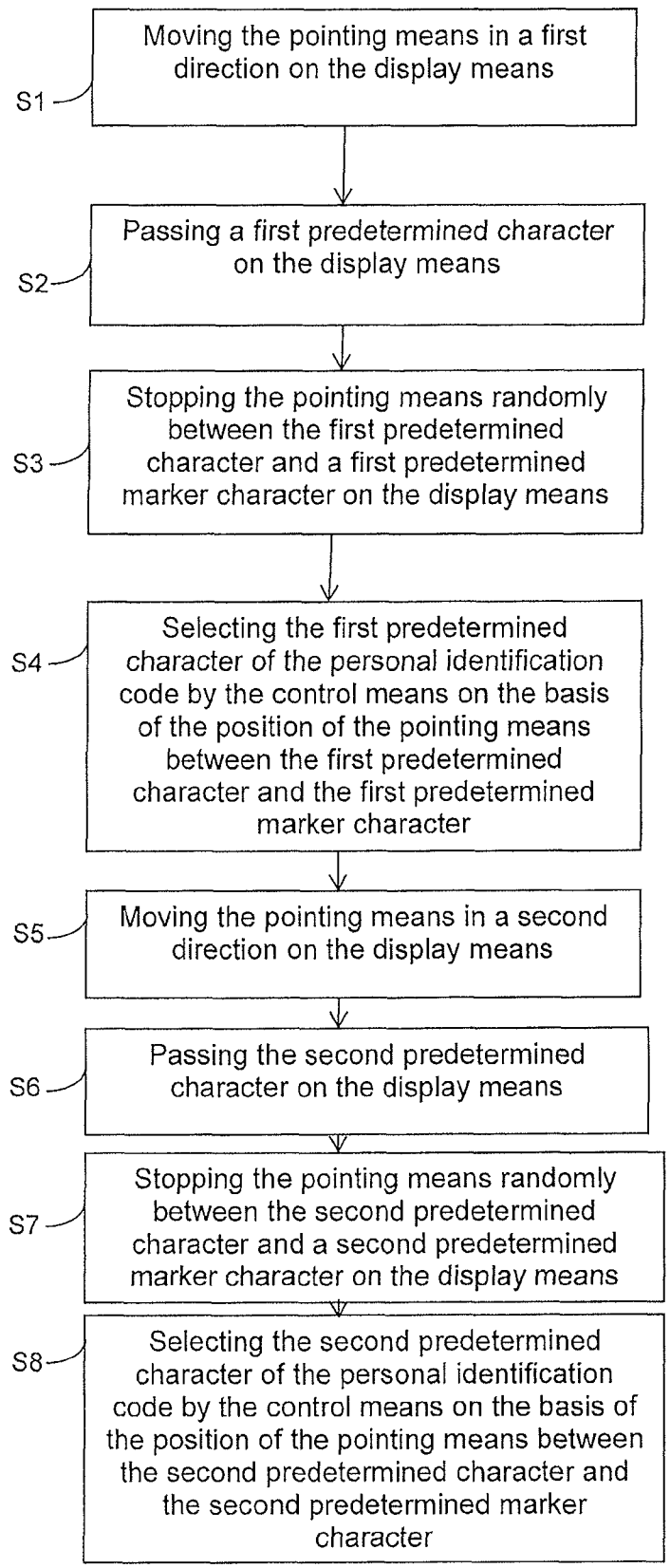
FIG. 4 shows a flow diagram illustrating the steps of conducting the present invention.

FIG. 4 shows a flow diagram illustrating the steps of conducting the present invention. In this figure S1 to S8 are the steps performed by the apparatus of the present invention.

Further modification will be apparent to those skilled in the art without depending from the scope of the present invention.

The invention claimed is:

1. An apparatus for selecting predetermined characters of a personal identification code, the apparatus comprising:
   a display configured to display a plurality of characters including the predetermined characters of the personal identification code;
   a pointer configured to move along the plurality of characters on the display under the control of a user;
   a processor configured to:
      receive pointer data including a direction of travel of the pointer and one or more characters that the pointer has moved past;
      select the predetermined characters of the personal identification code based on movement of the pointer along the plurality of characters on the display, wherein:
         the predetermined characters of the personal identification code include a first predetermined character and a second predetermined character;
         the first predetermined character of the personal identification code is selected when the received pointer data indicates:
            the direction of travel of the pointer was in a first direction on the display, the pointer has moved along the first direction past the first predetermined character, and the pointer stopped moving along the first direction between the first predetermined character and a first predetermined marker character on the display; and
         the second predetermined character of the personal identification code is selected when the received pointer data indicates:
            the direction of travel of the pointer was in a second direction on the display, the pointer has moved along the second direction past the second predetermined character, and the pointer stopped moving along the second direction between the second predetermined character and a second predetermined marker character on the display
   wherein the first predetermined character of the personal identification code and the first predetermined marker character are separated by at least one character that is not the first predetermined character or the first predetermined marker character; and
   wherein the second predetermined character of the personal identification code and the second predetermined marker character are separated by at least one character that is not the second predetermined character or the second predetermined marker character.

2. The apparatus of claim 1, wherein the first direction of movement of the pointer is opposite the second direction of movement of the pointer.

3. The apparatus of claim 1, wherein:
   the first predetermined marker character is located separate from the first predetermined character and is a copy of the first predetermined character; and
   the second predetermined marker character is located separate from the second predetermined character and is a copy of the second predetermined character.

4. The apparatus of claim 1, wherein:
   the first predetermined marker character is a different character from the first predetermined character of the personal identification code; and
   the second predetermined marker character is a different character from the second predetermined character of the personal identification code.

5. The apparatus of claim 1, wherein the processor is configured to communicate with an electronic device comprising a server or an electronic system.

6. The apparatus of claim 1, wherein the electronic device is configured to store the predetermined characters of the personal identification code.

7. The apparatus of claim 6, wherein the processor is configured to match each selected predetermined character with the stored predetermined characters.

8. The apparatus of claim 1, wherein the predetermined characters of the personal identification code are a plurality of digits.

9. The apparatus of claim 1, wherein the predetermined characters of the personal identification code are a plurality of symbols.

10. The apparatus of claim 1, wherein the predetermined characters of the personal identification code are a plurality of pictures.

11. The apparatus of claim 1, wherein the predetermined characters of the personal identification code are a combination of digits, symbols, and pictures.

12. The apparatus of claim 1, wherein the plurality of characters on the display are a plurality of symbols, pictures or digits.

13. A computer system comprising the apparatus of claim 1.

14. A mechanical lock comprising the apparatus of claim 1.

15. A mobile device comprising the apparatus of claim 1.

16. A method for selecting predetermined characters of a personal identification code using an apparatus including a display, a pointer moveable relative to the display, and a processor, the method comprising:

displaying a plurality of characters including the predetermined characters of the personal identification code, wherein the predetermined characters of the personal identification code include a first predetermined character and a second predetermined character;

receiving pointer data including a direction of travel of the pointer and one or more characters displayed on the display that the pointer has moved past;

selecting the predetermined characters of the personal identification code based on movement of the pointer along the plurality of characters on the display, wherein:

the first predetermined character of the personal identification code is selected when the received pointer data indicates:

the direction of travel of the pointer was in a first direction on the display;

the pointer has moved along the first direction past the first predetermined character on the display;

the pointer has stopped moving along the first direction between the first predetermined character and a first predetermined marker character on the display;

the second predetermined character of the personal identification code is selected when the received pointer data indicates:

the direction of travel of the pointer was in a second direction on the display;

the pointer has moved along the second direction past the second predetermined character on the display;

the pointer has stopped moving along the second direction between the second predetermined character and a second predetermined marker character on the display wherein the first predetermined character of the personal identification code and the first predetermined marker character are separated by at least one character that is not the first predetermined character or the first predetermined marker character; and wherein the second predetermined character of the personal identification code and the second predetermined marker character are separated by at least one character that is not the second predetermined character or the second predetermined marker character.

17. The method of claim 16, wherein the first direction of movement of the pointer is opposite the second direction of movement of the pointer.

\* \* \* \* \*